US009290622B2

(12) United States Patent
García Arrieta et al.

(10) Patent No.: US 9,290,622 B2
(45) Date of Patent: Mar. 22, 2016

(54) PROCESS AND DEVICE FOR POLYMERIZING LACTAMS MOLDS

(75) Inventors: Sonia García Arrieta, Guipuzcoa (ES); Luis Palenzuela Gutierrez, Guipuzcoa (ES)

(73) Assignee: Fundacion Inasmet, San Sebastian (Guipuzcoa) (ES)

( * ) Notice: Subject to any disclaimer, the term of this patent is extended or adjusted under 35 U.S.C. 154(b) by 24 days.

(21) Appl. No.: 12/972,890

(22) Filed: Dec. 20, 2010

(65) Prior Publication Data

US 2011/0148000 A1    Jun. 23, 2011

(30) Foreign Application Priority Data

Dec. 22, 2009 (EP) ..................................... 09382294

(51) Int. Cl.
| | |
|---|---|
| *B29C 41/42* | (2006.01) |
| *C08G 69/14* | (2006.01) |
| *B29B 7/40* | (2006.01) |
| *B29C 67/24* | (2006.01) |
| *C08G 69/16* | (2006.01) |
| *C08G 69/18* | (2006.01) |
| *B29K 77/00* | (2006.01) |

(52) U.S. Cl.
CPC ................ *C08G 69/14* (2013.01); *B29B 7/407* (2013.01); *B29C 67/246* (2013.01); *C08G 69/16* (2013.01); *C08G 69/18* (2013.01); *B29K 2077/00* (2013.01)

(58) Field of Classification Search
CPC ................................ B29C 41/42; B29C 31/04
USPC .................................................... 264/331.19
See application file for complete search history.

(56) References Cited

U.S. PATENT DOCUMENTS

| | | | |
|---|---|---|---|
| 3,505,448 A | 4/1970 | Zijp et al. | |
| 3,784,169 A * | 1/1974 | Bockmann et al. | 425/146 |
| 4,182,843 A | 1/1980 | Haupt et al. | |
| 4,233,433 A | 11/1980 | Hartmann | |
| 4,404,360 A | 9/1983 | Hartmann | |
| 4,426,348 A | 1/1984 | Salisbury | |
| 5,747,634 A | 5/1998 | Schmid et al. | |
| 5,756,647 A | 5/1998 | Schmid et al. | |
| 5,998,571 A * | 12/1999 | Nussdorfer | 528/315 |
| 6,013,758 A | 1/2000 | Schmid et al. | |
| 6,432,343 B1 * | 8/2002 | Zollondz et al. | 264/255 |
| 2006/0194941 A1 * | 8/2006 | Van Geenen et al. | 528/323 |

FOREIGN PATENT DOCUMENTS

| | | |
|---|---|---|
| AU | 669827 | 6/1996 |
| EP | 0872508 | 10/1998 |

(Continued)

OTHER PUBLICATIONS

European search report dated Feb. 17, 2011 from the corresponding European Patent Application No. 09382294.

*Primary Examiner* — Christina Johnson
*Assistant Examiner* — Xue Liu
(74) *Attorney, Agent, or Firm* — Florek & Endres PLLC

(57) ABSTRACT

The invention relates to a process and device for polymerizing lactams in molds wherein the monomer, catalyst and initiator are independently fed to a mixing head feeding a mold. The system in turn comprises a series of feeding and recirculation conduits and reservoirs the temperature of which is regulated to perform the polymerization in a controlled manner.

11 Claims, 1 Drawing Sheet

(56) References Cited  * cited by examiner

FOREIGN PATENT DOCUMENTS

EP  1777060   4/2007
WO  8203797   11/1982

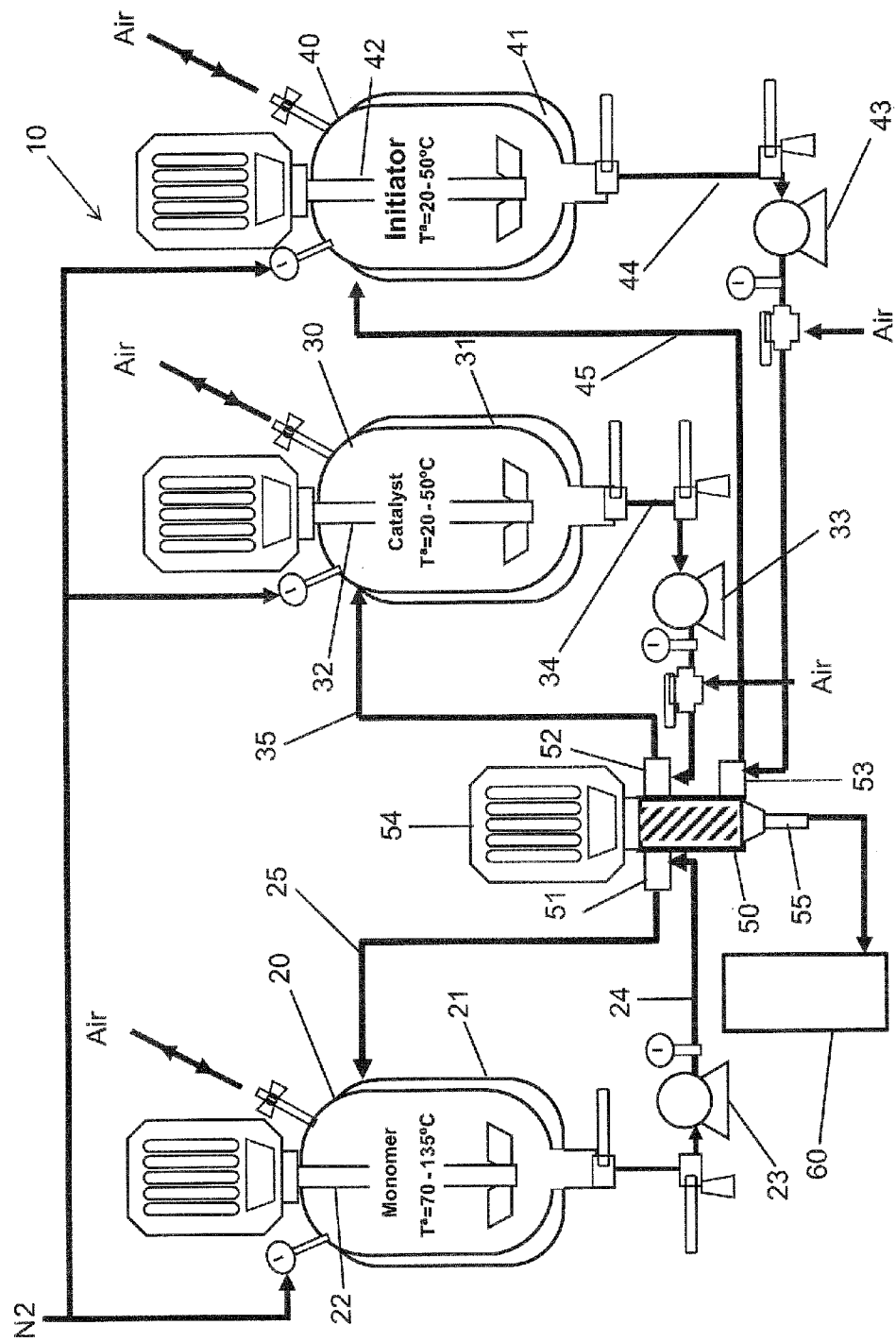

PROCESS AND DEVICE FOR POLYMERIZING LACTAMS MOLDS

FIELD OF THE INVENTION

The present invention relates to the techniques used in the chemical industry for polymerizing monomers and, more particularly, it relates to a process and system for polymerizing lactams in molds.

BACKGROUND OF THE INVENTION

The anionic polymerization of lactams in molds has been used and studied for several decades. Three essential components are involved in the reaction, namely, the lactam (or polyamide monomer) to be polymerized, the catalyst and the initiator or activator.

Up until now there are basic ways for mixing and feeding the reactive mixture to a mold. In the first option two independent premixtures are prepared, the first one comprises a mixture of the catalyst and a fraction of the lactam; and the second one consists of the initiator and the remaining fraction of the lactam. Both premixtures are subsequently combined to carry out the polymerization. An example of this way of polymerization can be found in U.S. Pat. No. 3,505,448; U.S. Pat. No. 4,182,843; U.S. Pat. No. 4,233,433, and U.S. Pat. No. 4,404,360.

In the second option, a premixture of the catalytic system, i.e., a mixture of the catalyst and activator, is prepared to then mix the catalytic system with the lactam, and all these ingredients already mixed are taken to the mold in which they are polymerized, examples of this way of polymerization of lactams are in patents EP 0,872,508; U.S. Pat. No. 5,747,634 and U.S. Pat. No. 5,756,647.

In fact, the latest efforts in improving the technique of polymerization of lactams have been focused on modifying the catalytic system to carry out the polymerization in a controlled and selective manner. However, the way in which the basic ingredients are mixed and fed to the mold has not changed and is still basically one of the two forms described above, i.e., the general technique is measuring the amounts of activator and catalyst separately and after preparing the respective premixtures.

Both traditional techniques have associated therewith high residence temperatures and times for the premixtures in the tanks. Obviously, in addition to the tanks or reservoirs necessary for each of the components for the polymerization, tanks or reservoirs are needed which are heated or maintained in special conditions for preparing the premixtures and having them at the suitable temperature before being injected to a mixing head so that from there they pass to the mold. For example in patent U.S. Pat. No. 4,404,360 a pair of tanks are used for the premixtures.

All the previous techniques allow producing serial parts of one and the same composition and properties but they are not suitable in the continuous manufacture of non-serial parts, for example with individual sizes and/or geometries, different compositions or characteristics.

SUMMARY OF THE INVENTION

A first object of the invention is a process for polymerizing lactams by molding comprising the following steps:

a) continuously feeding, in a mixing head, a lactam, a catalyst and an initiator; wherein the lactam, the catalyst and the initiator are each at a predetermined temperature and are independently fed into the head.

b) continuously mixing in the mixing head the lactam, the catalyst and the initiator, obtaining a reactive mixture, c) continuously feeding the reactive mixture to a mold (the mold can be an individual mold or part of a molding line comprising consecutive molds which move as they are filled with the reactive mixture)

d) allowing the reactive mixture to polymerize in the mold e) demolding the product obtained.

The step of mixing of phase b) can be performed simultaneously to the feeding of the monomer, catalyst and initiator into the mixing head of phase a). Specifically, the step of mixing of phase b) is initiated as the three mentioned components are fed and continues while the feeding thereof into the mixing head continues, i.e., it is not necessary to complete the feeding of the three components of phase a) for the step of mixing of phase b) to start.

The step of feeding to the mold of phase c) can be performed simultaneously to the step of mixing b). Therefore, phase a) of feeding to the head with the monomer, catalyst and initiator, phase b) of mixing in the mixing head and phase c) of feeding of the mold can be performed continuously, i.e., when the head is fed the mold is fed through the mixing head, in a continuous manner. The feeding of phase a) is only interrupted when the mold is changed.

The feeding of phase a) can comprise a step of recirculation, in independent circuits, of the lactam, catalyst and initiator.

In an embodiment of the invention, the lactam, the catalyst and the initiator are fed by means of respective independent feeding means which can continuously feed the mixing head. The feeding means can comprise independent heat-regulated reservoirs respectively containing the lactam, the catalyst and the initiator.

The independent feeding means can comprise interruption means for interrupting the feeding to the head and recirculation means for homogenizing each component before the feeding to the head, for example during the change of mold.

It is preferred that the lactam be fed at a temperature of between 70 to 160° C. In turn, feeding the catalyst at a temperature of between 20 to 50° C. is preferred, and the initiator is fed at a similar temperature, i.e., of 20 to 50° C.

The polymerization in the mold is preferably performed at a pressure of 0 to 3 bars and at a temperature of between 150 to 180° C.

The lactam is preferably ε-caprolactam or laurolactam.

The process optionally comprises cleaning the head after feeding the mixture to the mold, the cleaning is performed with a cleaning agent, said cleaning agent preferably being methylpyrrolidone.

The process can comprise adding reinforcing and additive products which are continuously fed to the mixing head together with the lactam in phase a). This allows obtaining a polyamide which is reinforced, nanoreinforced or to which special additives have been added.

The process can comprise the incorporation of materials to the mold prior to the feeding with the reactive mixture of phase c). This allows obtaining a part made of polyamide reinforced with continuous reinforcements or incorporating embedded materials.

A second object of the invention is a device for carrying out the process of the present invention. The device comprises feeding means for feeding a lactam comprising a reservoir (which can be heat-regulated) in which the lactam is maintained at a predetermined temperature; feeding means for feeding a catalyst comprising a reservoir (which can be heat-regulated) in which the catalyst is maintained at a predetermined temperature; there are also feeding means for feeding an initiator comprising a reservoir (which can be heat-regulated) in which the initiator is maintained at a predetermined temperature.

In addition to said (heat-regulated) reservoirs, the system comprises a mixing head in a flow connection with said reservoirs. The head has three independent inlets, the first for receiving the lactam, the second for receiving the catalyst and the third for receiving the initiator. The head mixes the monomer, the catalyst and the initiator to form a reactive mixture.

Finally, there are molding means comprising at least one mold in a flow connection with the head for receiving the reactive mixture. In this mold the polymerization of the reactive mixture is carried out, this process being able to be performed outside the device. These molding means comprise at least one mold, i.e., the molding means can be an individual mold which is changed for a different mold after the molding or a molding line comprising consecutive molds which move as they are filled with the reactive mixture. In the latter case, the mold full of reactive mixture is removed from the device for the polymerization of the mixture in the mold but outside the device, which allows another mold placed in a flow communication with the head to be simultaneously filled with reactive mixture.

The head can be a dynamic mixing head for simultaneously mixing the monomer, the catalyst and the initiator at the entrance thereof into the head. The feeding means for feeding the monomer, the catalyst and the initiator additionally comprise respective metering conduits communicating the heat-regulated reservoirs and the head. The temperature of the metering conduits is also controlled.

The feeding means for feeding monomer, catalyst and initiator can comprise respective recirculation conduits arranged between valves before the independent inlets of the head and each of the reservoirs for the monomer, the catalyst and the initiator, in which the temperature of the recirculation conduits is also controlled. The feeding flow of the monomer, the catalyst and the initiator can thus be continuous even when there is no mold. In this case, instead of being fed to the mixing head, the monomer, the catalyst and the initiator circulate through the recirculation conduits. By means of the valves before the independent inlets to the head the monomer, the catalyst and the initiator can be fed to the mixing head or passed to the recirculation conduits.

The device additionally comprises metering means which allow exactly and continuously metering the amount of monomer, initiator and catalyst to the head.

The process and device of the present invention have been developed and adapted so that, as a whole, it is possible to manufacture parts made of polyamide by means of an industrial process with medium-high output rate. This combination of technical factors allows the manufactured parts to have a varied size and geometric complexity which can be adapted to a wide range of mechanical requirements, specifically, the system is versatile.

BRIEF DESCRIPTION OF THE DRAWINGS

To complement the description which is being made and for the purpose of aiding to better understand the features of the invention according to a preferred practical embodiment thereof, a drawing is attached as an integral part of this description, in which the following has been depicted with an illustrative and non-limiting character:

FIG. 1 is a diagram schematically showing a device in which the process of the invention can be carried out.

DETAILED DESCRIPTION OF THE INVENTION

The process for polymerizing lactams of the present invention comprises: feeding, in a mixing head, a lactam, a catalyst and an initiator; wherein the lactam, the catalyst and the activator are each at a predetermined temperature and are independently fed in the head, which establishes the main difference with the prior art.

As the monomer, catalyst and initiator enter the mixing head, the mixing of these three components is initiated to obtain a reactive mixture, which is fed to the mold. Subsequently, the reactive mixture is allowed to polymerize in the mold; and the molded product is obtained. The monomer, catalyst and initiator are mixed as they enter the mixing head, such that the feeding thereof to the head is simultaneous to their mixing in the mixing head.

The molding process is performed at low pressure (0 to 3 bars) according to the volume, geometry of the part to be obtained and expected filling time, the temperature for the molding is 150 to 180° C. according to the expected rate of reaction and to the percentage of catalyst and initiator used.

The lactam can be selected for example from the group comprising β-lactam, γ-lactam, δ-lactam, ε-caprolactam and laurolactam, etc.

In turn, the initiators or activators can be isocyanates and derivatives thereof, as well as acyl-lactams, ureas and carboimides.

Meanwhile, the catalyst can be lactamates of alkali metals such as metal salts of sodium or magnesium, hydrates, hydroxides and metal amines or other organometallic compounds.

The control of the final mechanical properties of the molded material is achieved by acting on the concentration of the catalytic (catalyst and initiator) system and/or the combination of several monomers. Finally, the process and post-process conditions affect the degree of polymerization, crystallinity and moisture content.

In turn, in relation to the device for performing the process of the present invention, such device can be described based on FIG. 1 which shows a preferred embodiment of the present invention, in which the system 10 comprises a monomer reservoir 20, a catalyst reservoir 30 and an initiator reservoir 40, each of them being heat-regulated and preferably being under an inert atmosphere such as, for example, a nitrogen atmosphere which is fed through the upper part of the containers. The temperature regulation of each of said reservoirs is performed by means of a jacket 21, 31 and 41 with heat transfer fluid for each reservoir respectively.

Each reservoir 20, 30 and 40 has a stirrer 22, 32 or 42 which can be activated or deactivated by means of a programmable timer. The stirring speed can be controlled by means of independent variators with a range of speeds between 90 and 360 rpm in the reservoirs of the catalytic (catalyst and initiator) system and between 15 and 60 rpm for the lactam.

From each of said reservoirs 20, 30 and 40, the required component is metered to a dynamic mixing head 50. The means for the metering are respective pumps 23, 33 and 43 the temperature of which is controlled. The mixing head 50 has respective inlets 51, 52 and 53, the inlet 51 serves to allow the entry of the monomer to the head, the inlet 52 is used for the entry of the catalyst and the inlet 53 serves to allow the entry of the initiator, said inlets preferably comprise three-way valves (61, 62, 63).

For the correct metering of each of the components coming from each reservoir, it is necessary to perform a calibration of the flow rates of the metering pipes 24, 34 and 44, as well as the recirculation pipes, 25, 35 and 45, for the purpose of adjusting the percentage of each component used in the polymerization. This calibration is achieved by means of the opening of the valves of the inlets 51, 52 and 53 in an independent manner for each circuit.

To determine the volume of each casting in the mold 60 (i.e., size of the part) there is an automatic and programmable timer which allows adjusting the opening of the valves of the inlets 51, 52 and 53 for a time corresponding to the total volume of the polymerization mixture coming out through the nozzle 55. This time is different for different volumes.

The mixing head 50 has a motor 54 for making the mixture which is fed to the mold 60. The flow of the polymerization mixture towards the mold can be laminar to prevent bubble generation and air entrapments.

To meet the requirements of the product, the mold 60 varies according to the geometric complexity, dimensions of the part and standard size. The mold 60 can be machined from steel or aluminium with a double coil (heating and cooling with heat transfer fluid) or it can be a non-heated mold in itself and introduced in a stove or oven during the process for polymerizing the material.

In the mold 60, the flow front of the polymerization mixture advances in a vertical direction, i.e., entrance of material through the lowest point and exit through the highest point. The mold 60 has venting in all the areas in which air entrapments occur and which do not make the demolding of the part difficult or cause marks in the visible areas or an excessive cost for eliminating trimmings. The sealing system is made by means of a perimetric joint made of elastomeric material, likewise, a high-temperature demolding agent can be applied before the injection.

Once inside the mold 60, the control of the polymerization can be performed by means of the thermal monitoring of the material due to the fact that the polymerization reaction is exothermic.

Once the polymerization has ended and the part has been demolded and in order to perform the following casting in this mold, the mold must be cooled, which can be performed by means of forced cooling, according to the crystallinity which is to be obtained. Finally, the mold is opened and the shaped part is demolded. When, to increase the productivity, the molding means are not formed by a single mold but rather by a molding line comprising a set of molds, the process is similar but the polymerization takes place in the mold outside the device while another casting in another mold can be performed. As has been mentioned, an important point in the system is that each of the components involved in the polymerization reaction (caprolactam, initiator and catalyst) is metered from its corresponding reservoirs 20, 30 and 40 by means of independent metering pipes. An independent feeding system has been provided for each component, which feeding system comprises a reservoir 20, 30, 40, a metering pipe 24, 34, 44, a recirculation pipe 25, 35, 45, a metering system 23, 33, 43 and a feeding inlet valve 51, 52, 53. Heat stability problems associated with the high residence temperatures and times of the premixtures of the prior art are thus prevented.

The system additionally comprises recirculation pipes 25, 35 and 45 for the monomer, catalyst and initiator for the purpose of achieving the homogenization thereof in their respective tanks and therefore in the entire system. The monomer, catalyst and initiator circulate between their corresponding reservoir 21, 31, 41 through the pipes 25, 35 and 45 until the inlet valves 51, 52 and 53 close the recirculation circuit and allow the entrance of the three components to the dynamic mixing head 50 The temperature of said recirculation pipes 25, 35 and 45 is also controlled.

To facilitate the independent metering of each component, catalytic (activator and catalyst) systems undiluted in the lactam or other liquids at room temperature are preferred.

Likewise, to assure the robustness of the manufacturing process, the use of catalytic systems with low moisture sensitivity is preferred.

When the polyamide which is to be obtained must be reinforced, nanoreinforced or special additives must be added to it, these products will be incorporated in the lactam reservoir. When the part made of polyamide which is to be obtained must be reinforced with continuous reinforcements or incorporate embedded materials, they will be placed in the mold prior to the introduction of the material therein.

The function of the equipment of the system and the interconnection thereof is to melt, heat-regulate, homogenize, render inert, meter, mix and inject the different components so that they can polymerize properly in the mold. As has been stated, the feeding lines for feeding the monomer, catalyst and initiator are completely independent because each requires being regulated at a different temperature which can vary between room temperature and 160° C. From another point of view, there is a heat-regulated circuit for each component of the polymerization which takes it from its reservoir to the corresponding valve and from there it returns it to be homogenized.

All the areas of contact with the components must be able to be heat-regulated because the process temperatures are a decisive parameter in the polymerization rate and final quality of the material. Furthermore, during the homogenization and recirculation process of the material, cooling must not occur because this could cause solidifications, as in the case of caprolactam which solidifies at less than 70° C. The mixing system is dynamic and heat-regulated. The pumps 23, 33 and 43 are gear pumps and heated.

The heat-regulation of the reservoirs 20, 30 and 40 is performed by means of a jacket and heat transfer fluid since this system is much more precise than a direct electric heating, like the heating of the mixing head 50, although they could also be heated electrically. In relation to the metering means and pipes they are preferably heated electrically.

The head can optionally be cleaned after each cycle by means of a cleaning agent such as methylpyrrolidone, to that end a reservoir for this component can be included in the system. However, according to the cycle time defined in each case, it is possible to avoid cleaning the head by reducing the time between several castings. In the event of cleaning, the head is dried after each cleaning with hot air.

EXAMPLES

Example 1

Manufacture of Test Specimens in Polyamide-6 by Means of the Process of the Present Invention A part was manufactured formed by a series of test specimens in polyamide 6 containing: 3 dog-bone test specimens for tensile tests, 4 test specimens for the bending test and 6 test specimens for the impact test. The final manufactured part weighed 120 grams with a thickness of 4 mm.

The mold used to manufacture this part was a heat-regulated steel mold with a double oil/water circuit, a lower inlet, an upper outlet, two control thermocouples and closing by means of a hand press.

The mold was prepared by cleaning its cavity with a cloth and it was subsequently dried, the perimetric joint of the mold was subsequently inspected, a high-temperature demolding agent (Marbocote GRP ECO) was then applied, the mold was closed by means of a hand press and thermocouples were placed therein, lower inlet and upper outlet pipes for the material were placed. The mold was heated between 165-180° C. by means of the recirculation of high-temperature thermal oil through the internal circuits of the mold.

In turn, the components for the polymerization were maintained preserved from moisture. The monomer used was ε-caprolactam, and the catalytic system consisted of a sodium salt (dilactamate) and isocyanate prepolymer. The percentage used in the mixture was 0.88% molar in dilactamate and 07% molar in isocyanate, for the purpose of obtaining a fast polymerization.

Each of the components was loaded into its respective reservoir. The reservoirs work with an inert nitrogen atmosphere at 0.4 bars, and 1.2 bars in the methylpyrrolidone reservoir. The temperatures used in the system were the following:

T caprolactam reservoir and pipes: 125-140° C.
T dilactamate reservoir and circuits: 30-50° C.
T isocyanate reservoir and circuits: 20-30° C.
T head: 125-140° C.
The following process parameters were programmed
Speed of the dynamic mixing head: 2400 rpm
Casting time: 1 second A recirculation of the components was performed for the homogenization of the materials. To that end, the pumps of the selected circuits were put into operation.

The circuits were subsequently calibrated with the following flows to obtain the percentages of the required catalytic system:

Calibration of the caprolactam circuit: 120 g/s
Calibration of the dilactamate circuit: 4.02 g/s
Calibration of the isocyanate circuit: 1.98 g/s The mold was then connected to the casting nozzle of the dynamic mixing head, the material was cast in the mold, the inlet hose was disconnected and the head was cleaned.

Polymerization

The polymerization was controlled by means of the thermal monitoring of the mold. When the temperature of the material exceeded the initial temperature of the mold, it was possible to assure that the material had polymerized.

The mold was subsequently cooled by means of the water cooling circuit. Finally, the mold was opened and the part was demolded.

Example 2

Manufacture of a Mass Turning Part in Polyamide-6

A mass turning part was manufactured with a final total weight of 6,200 g, a diameter of 326 mm and a thickness of 80 mm.

The mold used to manufacture this part was a non-heat-regulated aluminium mold formed by three pieces, two side pieces and a perimetric annulus sealed together by means of two perimetric gaskets and a central internal gasket. The mold has two opposite inlets, two control thermocouples and mechanical closing by means of quick closures.

Initially, the cavity of the mold was cleaned with a cloth and dried. The perimetric and internal gaskets of the mold were inspected. A high-temperature demolding agent (Marbocote GRP ECO) was applied. The mold was closed by means of quick closures and the mold thermocouples, as well as the lower inlet and upper outlet pipes for the material, were placed. The mold was heated between 165 and 180° C. by introducing it inside an oven.

Each of the components was weighed according to the capacity of the reservoirs of the system and for the filling of the reservoirs and the circuits.

In turn, the components for the reaction were prepared as follows, the raw materials were stored preserved from moisture. The monomer used was ε-caprolactam, the catalytic system consisted of a sodium salt (dilactamate) and isocyanate prepolymer. The percentage used was 0.24% molar in dilactamate and 0.18% molar in isocyanate, for the purpose of obtaining a material with high mechanical performance and high elongation.

The reservoirs worked under the following conditions, nitrogen pressure: 0.4 bar in the reservoirs for the components (monomer, catalyst, initiator), whereas a pressure of 1.2 bars was used in the methylpyrrolidone reservoir. The following temperatures were handled in the system:

T caprolactam reservoir and pipes: 125-140° C.
T dilactamate reservoir and pipes: 30-50° C.
T U7 reservoir and pipes: 20-30° C.
T head: 125-140° C.
The following process parameters were programmed
Speed of the mixing head: 2400 rpm
Casting times: 20 seconds Likewise, a recirculation of the raw materials was performed for the homogenization of the materials. To that end, the pumps of the selected circuits were put into operation. The circuits were additionally calibrated with the following flows:

Calibration of the caprolactam circuit: 310 g/s
Calibration of the dilactamate circuit: 2.8 g/s
Calibration of the isocyanate circuit: 1.3 g/s The mold was subsequently connected to the casting nozzle of the head, the material was cast in the mold, the inlet hose was disconnected from the mixing head and the latter was cleaned.

Polymerization

The polymerization was controlled by means of the thermal monitoring of the mold. When the temperature of the material exceeded the initial temperature of the mold, it was possible to assure that the material had polymerized.

The mold was subsequently cooled by taking it out of the oven until it reached room temperature. The mold was opened and the part was demolded.

In view of this description and set of drawings, the person skilled in the art will understand that the embodiments of the invention which have been described can be combined in multiple ways within the object of the invention.

LIST OF REFERENCES

10 Polymerization system
20 Monomer reservoir
　21 Heat jacket
　22 Stirrer
　23 Metering pump
　24 Metering pipe
　25 Recirculation pipe
30 Catalyst reservoir
　31 Heat jacket
　32 Stirrer
　33 Metering pump
　34 Metering pipe
　35 Recirculation pipe
40 Initiator reservoir
　41 Heat jacket
　42 Stirrer
　43 Metering pump
　44 Metering pipe
　45 Recirculation pipe
50 Mixing head
　51, 52, 53 Components inlets 54 Motor
60 Mold
61, 62, 63 Three-way valves

The invention claimed is:

1. A method of polymerizing lactams in molds for the continuous manufacture of serial parts in corresponding molds, said manufactured parts having a variable size, geometry or composition, the method comprising:
(a) continuously feeding into a mixing head a lactam, a catalyst and an initiator;
wherein the lactam is at a first predetermined temperature between 70-160° C., the catalyst is at a second predetermined temperature between 20-50° C., and the initiator is at a third predetermined temperature between 20-50° C.,
wherein the lactam, the catalyst, and the initiator are each independently fed into the mixing head from respective independent reservoirs through respective inlets comprising valves,
wherein the lactam, the catalyst and the initiator are each circulated in independent circuits at said respective first, second and third predetermined temperatures;
(b) continuously mixing in the mixing head the lactam, the catalyst and the initiator, to obtain a reactive mixture;
(c) continuously feeding the reactive mixture obtained in step (b) through a nozzle into a mold,
wherein a volume of a casting into said mold is determined by adjusting the opening of the valves of the inlets for a time corresponding to a total volume of a polymerization mixture coming out through said nozzle, said volume of reactive mixture corresponding to a part to be manufactured, said adjustment of the opening of the valves being controlled by an automatic and programmable timer, thus allowing the automatic manufacture of serial parts having a variable size, geometry or composition;
(d) allowing the reactive mixture to polymerize in the mold to obtain a molded product; and,
(e) demolding the molded product.

2. The method of claim 1, wherein the steps (a) and (b) are performed simultaneously.

3. The method of claim 1, wherein the steps (a), (b), and (c) are performed simultaneously.

4. The method of claim 1, wherein the lactam is selected from the group consisting of β-lactam, α-lactam, δ-lactam, ε-caprolactam and laurolactam.

5. The method of claim 1, wherein the catalyst is a lactamate of an alkali metals.

6. The method of claim 1, wherein the initiator is selected from the group consisting of isocyanates, derivatives of isocyanates, acyl-lactams, ureas, and carboimides.

7. The method of claim 1, wherein step (a) further comprises feeding reinforcing and additive products with the lactam.

8. The method of claim 1, further comprising prior to step (c) a step of adding materials to the mold.

9. The method of claim 1, wherein the catalyst is a lactamate of an alkali metal, the alkali metal selected from the group consisting of metal salts of sodium or magnesium, hydrates, hydroxides and metal amines.

10. The method of claim 1, wherein the catalyst is a lactamate of an organometallic compound.

11. A method of polymerizing lactams in molds for the continuous manufacture of serial parts in corresponding molds, said manufactured parts having a variable size, geometry or composition, the method comprising:
(a) continuously feeding through respective inlets comprising valves into a mixing head a lactam, a catalyst and an initiator;
wherein the lactam is at a first predetermined temperature between 70-160° C., the catalyst is at a second predetermined temperature between 20-50° C., and the initiator is at a third predetermined temperature between 20-50° C.,
wherein the lactam, the catalyst and the initiator are each circulated in independent circuits;
(b) continuously mixing in the mixing head the lactam, the catalyst and the initiator, to obtain a reactive mixture;
(c) continuously feeding the reactive mixture obtained in step (b) through a nozzle into a mold,
wherein a volume of a casting into said mold is determined by adjusting the opening of the valves of the inlets for a time corresponding to a total volume of a polymerization mixture coming out through said nozzle, said volume of reactive mixture corresponding to a part to be manufactured, said adjustment of the opening of the valves being controlled by an automatic and programmable timer, thus allowing the automatic manufacture of serial parts having a variable size, geometry or composition;
(d) allowing the reactive mixture to polymerize in the mold to obtain a molded product; and,
(e) demolding the molded product.

* * * * *